United States Patent [19]

Casey

[11] Patent Number: 4,696,484
[45] Date of Patent: Sep. 29, 1987

[54] DOLLY FOR TOWING VEHICLES
[75] Inventor: Robert Casey, Washington, Ill.
[73] Assignee: Dover Corporation, Chattanooga, Tenn.
[21] Appl. No.: 856,202
[22] Filed: Apr. 28, 1986
[51] Int. Cl.[4] .............................................. B62D 33/08
[52] U.S. Cl. ............................. 280/43.16; 280/43.17; 280/43.23; 280/43.24; 280/79.1 A; 414/427
[58] Field of Search ............... 280/32.16, 47.15, 47.35, 280/87.01, 79.1 R, 79.1 A, 43.11, 43.14, 43.15, 43.16, 43.17, 43.23, 43.24; 414/426, 430, 427, 428

[56] References Cited
U.S. PATENT DOCUMENTS
3,080,196  3/1963  Darby ............................... 280/43.14
4,126,332 11/1978  Johansson ......................... 280/43.16

FOREIGN PATENT DOCUMENTS
672197 10/1963  Canada ............................... 280/79.1

Primary Examiner—John J. Love
Assistant Examiner—Richard Camby
Attorney, Agent, or Firm—Alan Ruderman

[57] ABSTRACT

A towing dolly has a pair of supports between which a pair of wheels of a disabled vehicle may be cradled, the supports being carried by rails on which respective pairs of rocker arms are pivotally mounted. Each rocker arm carries a dolly support wheel and a mounting adapted to that a hydraulic jack may be positioned between the pair of rocker arms of each rail. Upon actuation of the hydraulic jack the rails and thus the wheel engaging supports are raised relative to the axles of the dolly wheels, thereby raising the wheels of a disabled vehicle cradled on the supports. A locking device is carried by each rocker arm for cooperating with a respective hold-down block on the rails after the rocker arm has been pivoted by actuation of the hydraulic jack so that the hydraulic jack may be removed while the disabled vehicle is towed.

5 Claims, 4 Drawing Figures

DOLLY FOR TOWING VEHICLES

BACKGROUND OF THE INVENTION

This invention relates to a dolly for supporting a pair of wheels of a vehicle as it is being towed by a rescue vehicle such as a tow truck, and more particularly to a dolly of this type which can be safely raised and lowered by a removable jack and locked in the raised position when towing a vehicle.

It is known in the prior art to provide a dolly having four wheels between which a pair of wheels of a disabled vehicle may be cradled when towed. Such devices are necessary when the disabled vehicle cannot be towed with its own wheels on the ground. However, the prior art dollies have been deficient in some aspects, not the least of which is safety.

In some of the known apparatus the wheel carriage or cradle is fixed so that the towing vehicle must lift the disabled vehicle onto the dolly cradle, thereby providing an inconvenience in use. In other prior art dollies mechanical devices are utilized to lift and lower the cradle, the disabled vehicle being moved onto the cradle and the cradle thereafter being lifted for towing, and lowered when the disabled vehicle is removed. Some of these mechanical devices use a ratchet type mechanism which permits a step-by-step raising of the carriage, but when the carriage is to be lowered the disabled vehicle must first be lifted before being lowered. The operator must apply the lifting force and the cradle thereafter drops the disabled vehicle to the ground. Other mechanical devices use a leverage bar with which the operator applies a pivoting action lifting force and effectively manually supports the disabled vehicle as he swings the bar through the appropriate angle, but upon lowering the cradle with the disabled vehicle the force changes direction and if the operator is not braced properly there is a sudden release and the bar may be pulled rapidly from the operator's hands. These mechanical devices may therefore result in injury to the operator and/or damage to the disabled vehicle. Moreover, with the known mechanically lifted dollies, when used under conditions of ice and snow, the mechanisms can freeze and fail to operate.

SUMMARY OF THE INVENTION

Consequently, it is a primary object of the present invention to provide a towing dolly which may safely raise and lower a pair of wheels of a disabled vehicle.

It is another object of the present invention to provide a towing dolly which can be raised and lowered by a manually placed hydraulic jack, the jack being removable during towing after the wheels of a disabled vehicle have been raised to the towing position.

It is a further object of the present invention to provide a towing dolly which is inexpensive yet safe for raising the wheels of a disabled vehicle for towing and for lowering the wheels subsequent thereto.

Accordingly, the present invention provides a towing dolly having a pair of supports between which a pair of wheels of a disabled vehicle may be cradled, the supports being carried by rails on which a respective pair of rocker arms are pivotably mounted. Each rocker arm carries a dolly support wheel and a mounting adapted so that a hydraulic jack may be positioned between the pair of rocker arms of each rail. Upon actuation of the hydraulic jack the rails and thus the wheel engaging supports are raised relative to the axles of the dolly wheels, thereby raising the wheels of a disabled vehicle cradled therebetween.

A locking device is positioned on each rocker arm adapted to cooperate with a respective keeper on the rails after the rocker arm has been pivoted by the actuation of the hydraulic jack into the raised wheel position. The hydraulic jack may then be removed and the disabled vehicle towed. When the disabled vehicle is to be lowered, the hydraulic jack is repositioned between the rocker arms, the locking device disengaged, and the force of the jack gradually reduced to slowly pivot the rocker arms to the lowered wheel position.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
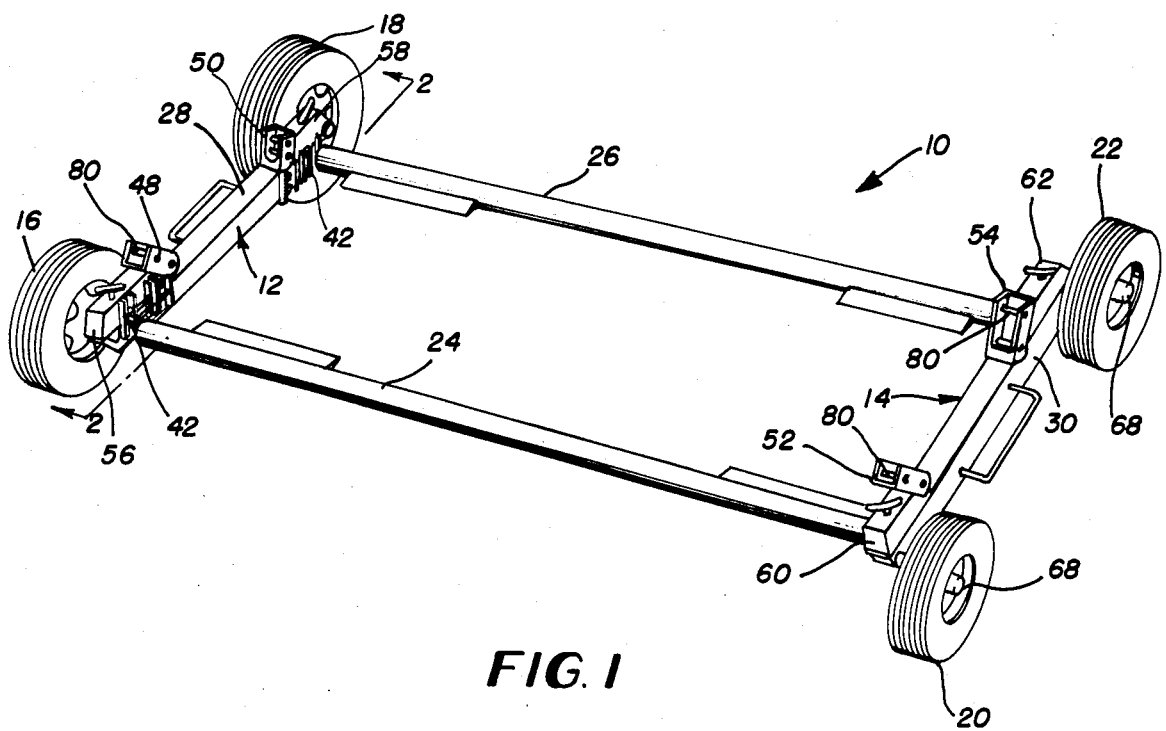
FIG. 1 is a front perspective view of a towing dolly constructed in accordance with the principles of the present invention, the dolly being illustrated in the raised position.

Referring to the drawings, a towing dolly 10 constructed in accordance with the present invention comprises a pair of side rail assemblies 12, 14 including supporting wheels 16, 18, 20, 22. A pair of supporting cross members 24, 26 preferably in the form of tubular members are connected to and extend between the rail assemblies 12, 14. The length of each of the cross members is such that a pair of laterally disposed wheels of a disabled vehicle can be positioned between the side rail assemblies, while the spacing between the members 24, 26 may be adjustable within limits as hereinafter described.

Each side rail assembly 12, 14 includes a respective side rail 28, 30, on the interior facing surfaces of which there are pairs of vertically extending spaced plates 32, 34, 36 fixed to the rails adjacent the locations of the wheels 16, 18, 20, 22. A pair of horizontally disposed rods 38, 40 spaced one above the other is secured to and extends through the plate pairs 32, 34, 36. The ends of each cross member 24, 26 include a hanger bracket 42 having fingers with arcuate recesses for engaging and hooking onto the rails 38, 40 between selective pairs of plates 32, 34, 36 so that the cross members may be removably positioned at selective locations along the side rails 28, 30 at the proper location for cradling the wheels of a disabled vehicle.

Fixedly disposed on the upper surface of the rails 28, 30 spaced from the ends thereof is a respective lug 44 having a bore for receiving a journal pin 46. A respective rocker arm pivot block 48, 50, 52, 54 having a bifurcated configuration is journally mounted on each pin disposed about a respective lug 44. Fixed to each pivot block 48, 50, 52, 54 is a respective rocker arm 56, 58, 60, 62, having hollow interiors for fitting over the respective end of a side rail. Each rocker arm carries a spindle support plate 64 having a spindle 66. Each spindle journally mounts a respective one of the support wheels 16, 18, 20, 22 on a central portion thereof, the wheels being secured axially by a cap 68 threaded onto the outer end of the spindle 66.

Journally disposed through a bore in each rocker arm 56, 58, 60, 62 is a rocker arm hold-down assembly including a rod 70 having threads 72 at one end disposed so as to extend through the bottom of the rocker arm, and a manually engageable operator 74 at its other end extending through the top of the rocker arm, a retaining ring 76 acting to prevent inadvertent removal of the rod from the rocker arm. A rocker arm hold-down block 78 disposed on the ends of each rail 28, 30 has a threaded bore for receiving the threads 72 when the respective rocker arm is pivoted toward the rail or, to be more precise, when the rails are moved upwardly as hereinafter described.

Figure 3:
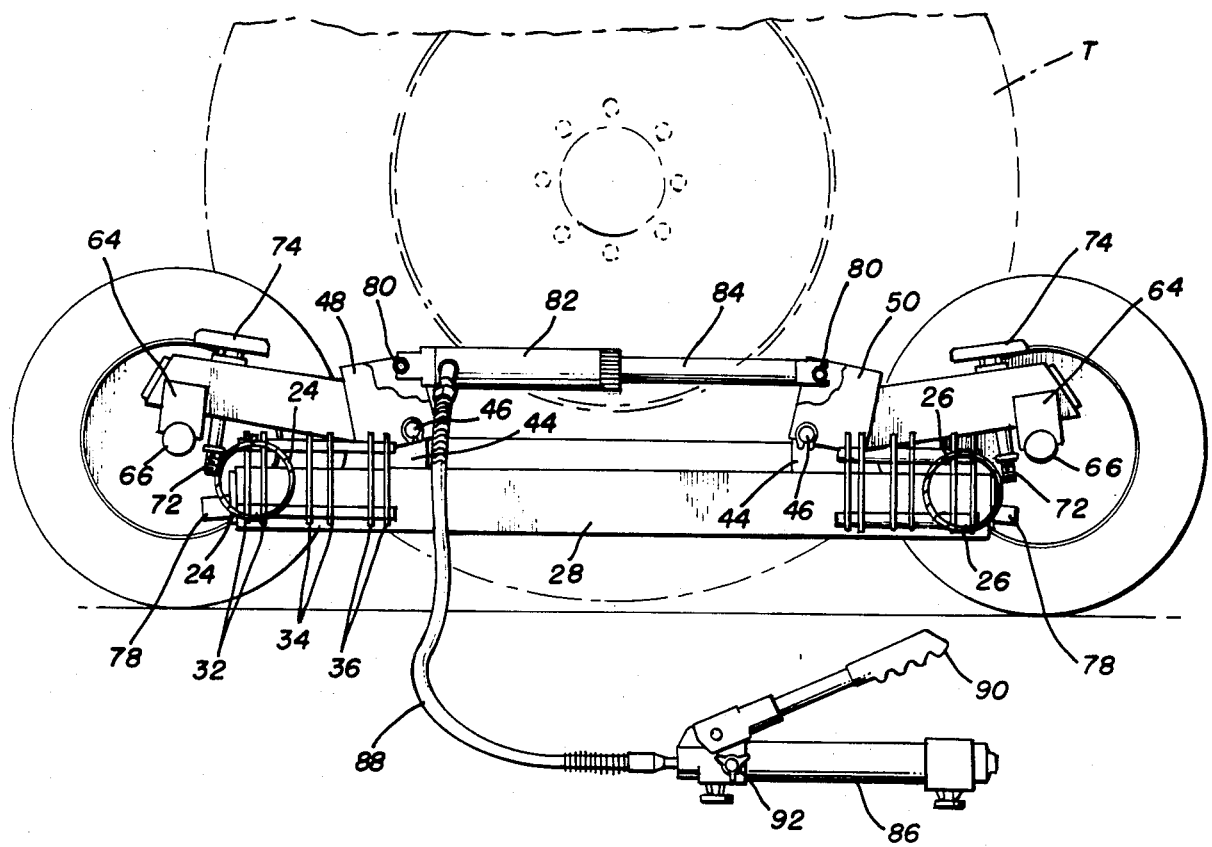
FIG. 3 is a view similar to FIG. 2 with the hydraulic jack in place and the dolly in a partly raised position.
Figure 4:
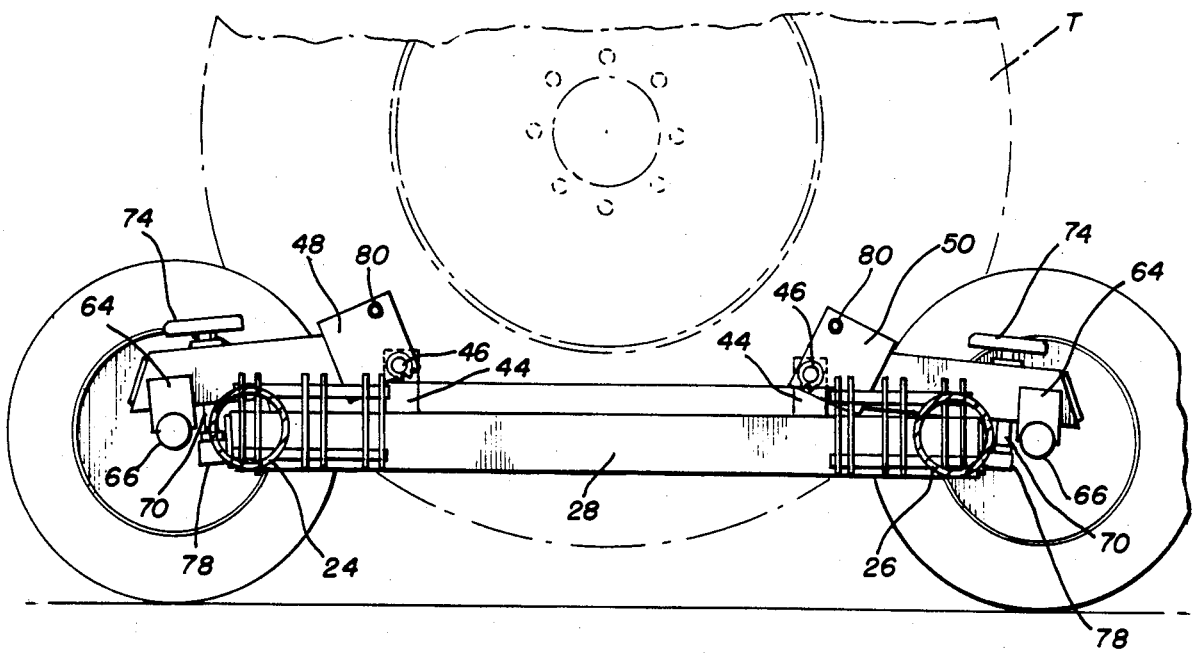
FIG. 4 is a view similar to FIG. 2 with the dolly in the raised or towing position.

Disposed in each pivot block 48, 50, 52, 54 spaced from the journal pin 56 is an abutment pin 80, the purpose of which is to receive an arcuate notch formed in the piston end of a hydraulic cylinder 82 and a similar notch at the end of the piston rod 84. A hand operated hydraulic pump 86 may be used to pump hydraulic fluid through a line 88 into the piston end of the cylinder 82 when the cylinder 82 is disposed so that the respective notches engage the abutment pins 80 of the pivot blocks 48, 50 or 52, 54 of one side rail 28, 30 as illustrated in FIG. 3, the cylinder and pump forming a hydraulic jack means. Thereafter as the handle 90 of the pump 86 is cranked, and the piston rod 84 is forced out of the cylinder 82, the respective side rail 28, 30 is lifted until the threads 72 may be inserted into the bore of the hold-down block 78 so that the respective operator 74 may lock the rocker arm to the side rail in that position, as illustrated in FIG. 4. The hydraulic pressure in the cylinder 82 may then be released by a valve control 92 of the pump 86. The same proceedure may then be used to raise the other of the side rails 28, 30.

Figure 2:
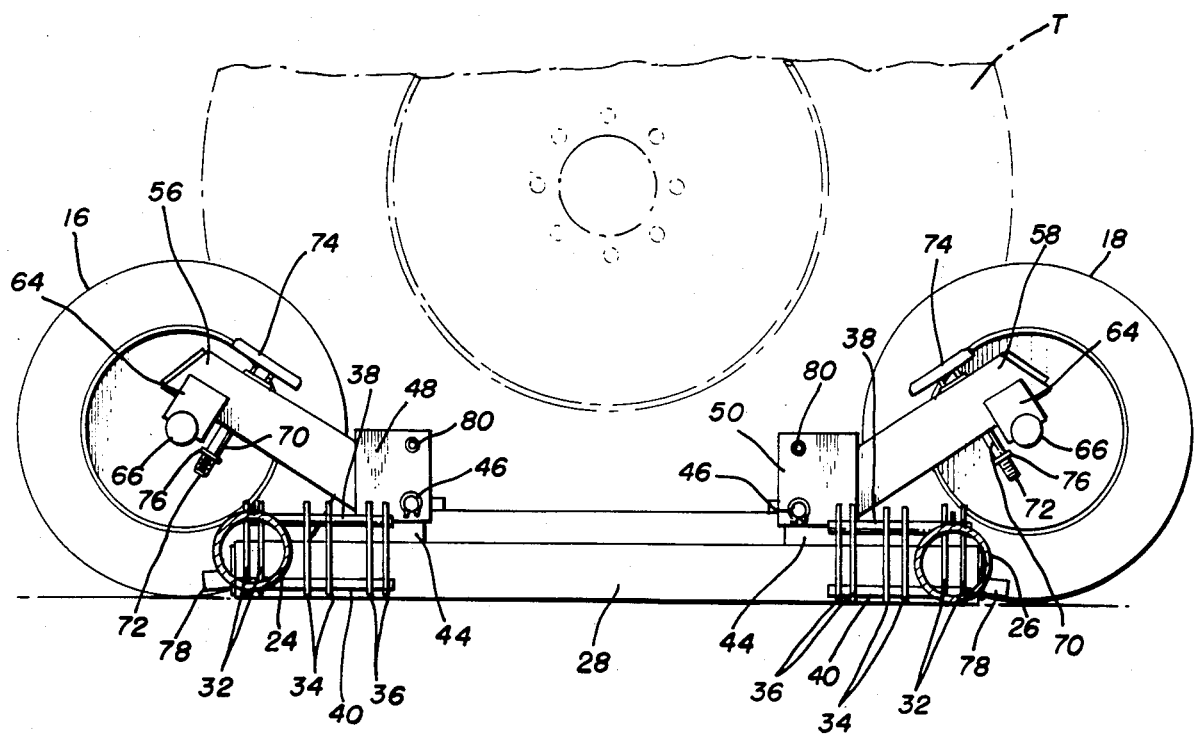
FIG. 2 is a vertical cross sectional view taken substantially along line 2—2 of FIG. 1 illustrating a wheel of a disabled vehicle in phantom, the dolly being in the lowered position to receive or relinquish the wheels of a disabled vehicle.

It should be understood that since the wheels 16, 18, 20, 22 are disposed on the roadbed or other fixed surface, as the rocker arms pivot about the journal pins 46, the respective side rail is lifted. The relative positions of the wheels 16, 18, 20, 22 and the journal pins 46 are changed from that illustrated in FIG. 2 to that illustrated in FIG. 4 as the rails are raised. By appropriate sizing and geometry of the wheels 16, 18, 20, 22 and the rocker arms 48, 50, 52, 54 the rails 28, 30 may be disposed on the roadbed when in the lowered position as illustrated, or above the roadbed if desirable. With the rails disposed on the ground a tire T can be readily positioned and cradled between the supports 24, 26. To lower the rails, the cylinder 82 is again disposed between a pair of pivot blocks 48, 50 or 52, 54. With the piston rod extended to support the pivot blocks against movement, the operator 74 of the respective rocker arm is turned to release the threads 72 from the hold-down block 78. The hydraulic pressure in the cylinder may then be released by the valve control 92 to gradually lower the side rail. After one side has been lowered, the same proceedure is used to lower the other side.

It may thus be seen that the tires T on the front or rear of a disabled vehicle may be raised and lowered simply by means of this invention and the disabled vehicle towed with the tires off the roadbed. By means of the adjustable cross member, the side rails may be positioned adjacent the tires and the cross members attached to the side rails to cradle the tires prior to commencing the lifting operation.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A towing dolly for lifting and supporting a pair of laterally spaced wheels of a disabled vehicle for towing thereof, said dolly comprising a pair of side rails, a pair of spaced apart cross members, mounting means for removably connecting each cross member to both rails for supporting said cross members and for spacing said rails apart laterally, the cross members being adapted to support and cradle the wheels of the disabled vehicle thereon, a pair of pivot blocks for each side rail, journal means for pivotably mounting each pair of pivot blocks at spaced locations on the respective side rail, a rocker arm secured to each pivot block for moving therewith, the rocker arms of each side rail extending away from and in opposite directions to each other, support means for rotatably carrying a dolly support wheel on each rocker arm remote from a respective journal means, abutment means carried by each pivot block spaced from said journal means facing toward the other pivot block associated with each respective rail, a removable extendible jack means adapted to be placed selectively between and engage the abutment means associated with a respective rail, such that extension of the jack means forces the pair of blocks associated with a rail to pivot relative to the rail to lift the rail relative to the support wheels associated with that rail, and hold-down means for securing said rocker arms to the corresponding side rail when said rail has been raised so that said jack means may be removed from engagement with the abutment means associated with the lifted rail and repositioned between and engage the abutment means associated with the other rail for lifting said other rail.

2. A towing dolly as recited in claim 1, wherein said mounting means comprises means for adjustably connecting said cross members to said rails.

3. A towing dolly as recited in claim 2, wherein said means for adjustably connecting said cross members to said rails comprises a series of spaced vertically extending plates secured to each rail adjacent each end thereof, a pair of horizontally extending rods carried by each said series of plates in vertically spaced relationship, and a hanger bracket secured at each end of each cross member, said hanger bracket having spaced notches for receiving and resting on said rails.

4. A towing dolly as recited in claim 1, wherein said hold-down means comprises a keeper block corresponding to each rocker arm secured to the respective rails at dispositions beneath the respective rocker arm, and a locking member carried by each rocker arm adapted to be cooperatively secured to the respective keeper block when the rail has been raised.

5. A towing dolly as recited in claim 4, wherein each keeper block has a threaded bore and each locking member includes a threaded rod adapted to be threadedly received in the bore of a respective keeper block.

* * * * *